United States Patent Office 3,849,439
Patented Nov. 19, 1974

3,849,439
PROCESS FOR THE PRODUCTION OF ORGANIC PHOSPHORIC ACID ESTERS
Kennosuke Imamura, Tokyo, Shukichi Nabekawa, Funabashi, and Masao Takada, Tokyo, Japan, assignors to Nippon Chemical Industrial Co., Ltd., Tokyo, Japan
No Drawing. Filed Jan. 6, 1972, Ser. No. 215,903
Claims priority, application Japan, Aug. 10, 1971, 46/59,906
Int. Cl. C07d 27/52
U.S. Cl. 260—326 E                    13 Claims

ABSTRACT OF THE DISCLOSURE

The process for producing an organic phosphoric acid ester of the formula

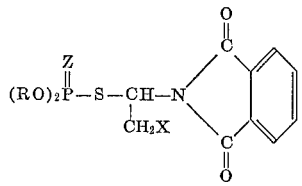

wherein R represents an alkyl group having 1-3 carbon atoms, Z represents an oxygen atom or a sulfur atom, and X represents a chlorine atom or a bromine atom by reacting an o,o-dialkylthiophosphoric acid or dithiophosphoric acid with N-(1-alkoxy-2-haloethyl)phthalimide in the presence of an acid catalyst.

BACKGROUND OF THE INVENTION

Field of the Invention

The present invention relates to a process for producing organic phosphoric acid esters and more particularly, it relates to a process for producing the organic phosphoric acid ester represented by the general formula I

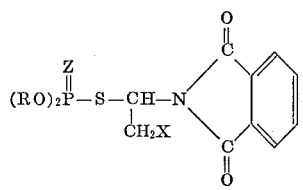

(I)

wherein R represents an alkyl group having 1-3 carbon atoms, Z represents an oxygen atom or a sulfur atom, and X represents a chlorine atom or a bromine atom, such as, particularly, o,o - dialkyl - S - (2-halo-1-phthalimidoethyl) - phosphorodithioate and o,o - dialkyl - S- (2-halo-1-phthalimidoethyl)-phosphorothioate.

DESCRIPTION OF THE PRIOR ART

It is known that the aforesaid organic phosphoric acid esters have an excellent insecticidal effect and they are ordinarily prepared by the reaction of o,o-dialkyldithiophosphoric acid salts or o,o,-dialkylthiophoric acid salts with N-(1,2-dihaloethyl)-phthalimide. The reaction is shown by the following reaction formula:

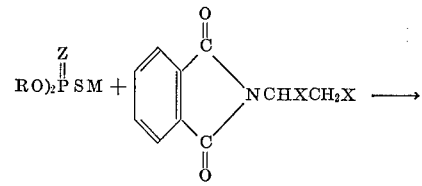

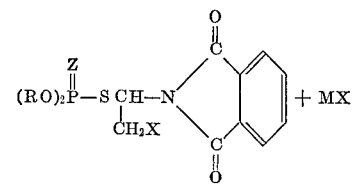

wherein R represents an alkyl group having 1-3 carbon atoms; Z represents an oxygen atom or a sulfur atom; M represents an alkali metal, ammonium, or an amine; and X represents a chlorine atom or a bromine atom.

In this case, the N-(1,2-dihaloethyl)phthalimide which is the starting material in the above reaction is prepared by halogenating N-vinylphthalimide or by the reaction of N-(2-haloethyl)phthalimide with a halogenated succinimide. However, in the former method, the yield is low as well as it is industrially quite profitable to obtain N-vinylphthalimide. On the other hand, in the latter method, although the yield is not so low as in the former method, the reaction itself is not profitable and further it is also difficult to industrially obtain N-(2-haloethyl)phthalimide. For such reasons, it is difficult to industrially obtain N-(1,2-dihaloethyl)phthalimide by the aforesaid conventional methods.

The above-mentioned conventional process of producing the organic phosphoric acid ester by the above reaction formula using N-(1,2-dihaloethyl)phthalimide as the starting material is accompanied by various troubles, for example, the yield of the organic phosphoric acid ester from phthalimide or phthalic anhydride is quite low, and it is not easy to industrially produce the product.

SUMMARY OF THE INVENTION

The inventors have investigated a profitable process of producing the aforesaid organic phosphoric acid esters and as a result have discovered a novel reaction different from the above-mentioned conventional reaction.

That is, according to the present invention, there is provided a process for producing an organic phosphoric acid ester represented by the general formula I

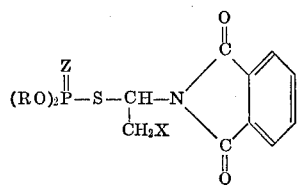

(I)

wherein R represents an alkyl group having 1-3 carbon atoms; Z represents an oxygen atom or a sulfur atom; and X represents a chlorine atom or a bromine atom, which comprises reacting an o,o - dialkylthiophosphoric acid or dithiophosphoric acid represented by the general formula II

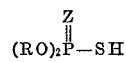

(II)

wherein R and Z have the above meaning with N-(1-alkoxy-2-haloethyl)phthalimide represented by the general formula III

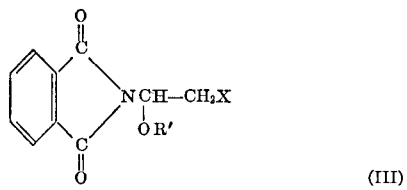

(III)

wherein R' represents an alkyl group having 1–3 carbon atoms and X has the above meaning in the presence of an acid catalyst.

DETAILED DESCRIPTION OF THE INVENTION

By the Inventors' experiments, it has been confirmed that the starting material, N-(1 - alkoxy-2-haloethyl) phthalimide is obtained by the reaction of phthalimide with 1,2-dihaloethyl alkyl ether and thus the process of this invention is very advantageous economically.

Examples of the N-(1 - alkoxy - 2 - haloethyl)phthalimide are N-(1-methoxy-2-chloroethyl)phthalimide, N-(1-methoxy-2-bromoethyl)phthalimide, N - (1 - ethoxy-2-chloroethyl)phthalimide, N - (1 - ethoxy-2-bromoethyl)-phthalimide, N - (1 - n - propoxy-2-bromoethyl)phthalimide, N-(1-n-propoxy-2-chloroethyl)phthalimide, N - (1-iso-propoxy - 2 - chloroethyl)phthalimide, and N-(1-iso-propoxy-2-bromoethyl)phthalimide.

On the other hand, the other starting material, the o,o-dialkylthiophosphoric acid, or the o,o-dialkyldithiophosphoric acid are ones represented by the above general formula II having up to three carbon atoms.

The reaction of this invention requires an acid catalyst. The acid catalysts used in this invention are protonic acids such as hydrochloric acid, sulfuric acid, and phosphoric acid and electron-pair acceptors, so-called Lewis acids such as zinc chloride. They may be used individually or as a combination of them.

When only the protonic acid is used in the reaction of this invention, the reaction proceeds smoothly but a side reaction tends to occur to reduce the yield of product, while in the case of using only the electron-pair acceptor such as zinc chloride, the above difficulties may be avoided but since the rate of reaction is low, the reaction period of time must be prolonged. Therefore, ordinarily it is profitable to use the protonic acid and an electron-pair acceptor such as zinc chloride, at the same time.

The proportion of the acid catalyst is 0.1–1.5 mols per mol of the o,o-dialkylthiophosphoric acid or the o,o-dialkyldithiophosphoric acid but; when the protonic acid is used individually, the proportion is preferably 0.5–1.5 mols or more. Furthermore, when the mixture of protonic acid and Lewis acid is used the proportion thereof is also within the above range and the mole ratio of protonic acid and Lewis acid is 1:0.1–1.

The reaction of this invention is usually conducted at a temperature of from room temperature to 110° C., preferably from 30° C. to 60° C.

When the reaction is conducted at temperatures lower than room temperature, the rate of reaction is lowered or reaction does not proceed. On the other hand, the reaction proceeds rapidly at an elevated temperature, but from the thermal stability of the organic phosphoric acid, the other limit is as defined above. The reaction period of time is influenced by the amount of the catalyst and the kind thereof, particularly the amount of zinc chloride, but is usually from about one hour to about five hours preferably from about 2 to about 4 hours. The reaction can be sufficiently conducted in a stoichiometrical ratio but in fact, it is desirable that the proportion of the organic phosphoric acid mentioned above be slightly excessive, for example 1–1.5 mols based on N-(1-alkoxy-2-haloethyl)phthalimide.

The reaction of this invention may be conducted without using solvent but is preferably conducted in a proper solvent in operation. As the solvents which may be employed, there are illustrated benzene, toluene, xylene, chlorobenzene, carbon tetrachloride, etc.

After conducting the reaction under the above-mentioned conditions, the organic layer was washed in an ordinary manner and thereafter the solvent is removed, whereby the desired product can be obtained.

As mentioned above, in the process of this invention the materials which can be easily prepared or available are used as the starting materials and also the reaction can proceed at a comparatively low temperature. Therefore, the desired product can be usually obtained in a good yield and in a high purity.

The invention will now be described more practically by the following examples.

Example 1

Production of

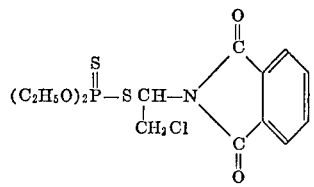

In 200 g. of toluene were dissolved 19.5 g. of o,o-diethyldithiophosphoric acid and 25.3 g. of N-(ethoxy-2-chloroethyl)phthalimide with stirring and after further adding 13.6 g. of anhydrous zinc chloride to the solution, 0.3 g. of hydrogen chloride was blown into the system. Then, the mixture was heated for one hour at 35–40° C. to finish the reaction. After cooling the product, the reaction product was placed in a separating funnel and the lower alcohol layer containing zinc chloride was separated. On the other hand, the upper toluene-containing liquid was washed with a hydrochloric acid solution, a sodium carbonate solution, and then water to remove any remaining zinc chloride, o,o-diethyldithiophosphoric acid, etc. After washing, toluene was distilled away and the residue was cooled to provide 39 g. of the faint yellow solid of o,o-diethyl(1 - phthalimido-2-chloroethyl)phosphorodithioate. The purity of the product was confirmed to be 92% by means of gas chromatography. When the product was recrystallized from ethanol, pure crystals having a melting point of 66° C. were obtained.

Elementary analysis.—Calculated: P, 7.86%; Cl, 9.00%; S, 16.28%. Found: P, 7.85%; Cl, 9.00%; S, 16.12%.

Example 2

Production of

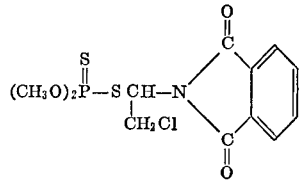

In 200 g. of benzene were dissolved 16.6 g. of o,o-dimethyldithiophosphoric acid and 25.3 g. of N-(1-ethoxy-2-chloroethyl)phthalimide with stirring, and then 13.6 g. of anhydrous zinc chloride and 5 ml. of 35% by weight concentrated hydrochloric acid were added to the solution. Thereafter, the mixture was heated at 35–40° C. for one hour to finish the reaction. After cooling, the reaction product was washed as in Example 1 and the benzene was distilled away to provide 35 g. of the yellow-brown oily liquid of o,o-dimethyl-S-(1-phthalimido-2-chloroethyl)phosphorodithiate. When the liquid product was cooled, a faint brown solid was obtained. The purity of the product was confirmed to be 89.5% by means of gas chromatography. When the product was recrystallized from benzene-hexane solvent system, white crystals of the desired product having a melting point of 76.7° C. were obtained.

Elementary analysis.—Calculated: P, 8.47%; Cl, 9.69%; S, 17.53%. Found: P, 8.41%; Cl, 9.7%; S, 17.3%.

Example 3

Production of

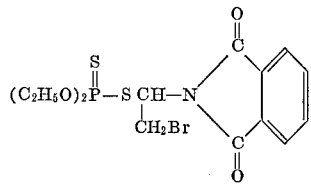

To 200 g. of benzene were added 18.6 g. of o,o-diethyldithiophosphoric acid and 28.4 g. of N-(1-methoxy-2-bromoethyl)phthalimide with stirring, and then after further adding 7 g. of anhydrous zinc chloride and 10 ml. of 98% by weight concentrated sulfuric acid to the mixture, the resultant mixture was heated for 3 hours at 40° C. to finish the reaction. After cooling, the reaction product was placed in a separating funnel. The benzene layer was then washed with a hydrochloric acid solution, a sodium carbonate solution, and then water and then benzene were distilled away to provide 42 g. of a yellow-brown oily liquid. When the product was recrystallized from a benzene-hexane solvent system (1:4 by volume), 35 g. of faint orange crystals of the product were obtained. The melting point thereof was 73.5–74.5° C.

Elementary analysis as o,o-diethyl-S-(1-phthalimido-2-bromoethyl)phosphorodithioate.—Calculated: P, 7.07%; Br. 18.23%; S, 14.63%. Found: P, 7.02%; Br. 18.1%; S, 14.51%.

Example 4

Production of

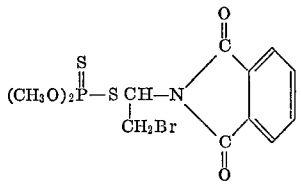

To 200 g. of toluene were added 15.8 g. of o,o-dimethyldithiophosphoric acid and 29.8 g. of N-(1-ethoxy-2-bromoethyl)phthalimide with stirring, and after further adding 7 g. of anhydrous zinc chloride and 10 ml. of 35% by weight concentrated hydrochloric acid to the mixture, the resultant mixture was heated for 3 hours at 40° C. to finish the reaction. After cooling, the toluene layer of the reaction product was washed as in Example 3 and then toluene was distilled away to provide 39 g. of light brown viscous liquid. By adding a small amount of ethanol to the product and cooling the mixture, crystals having a melting point of 98–100° C. were obtained.

By recrystallizing the product from a benzene-hexane solvent system (1:4 by volume), orange crystals of the product having a melting point of 103° C. were obtained.

Elementary analysis as o,o-dimethyl-S-(1-phthalimido-2 - bromoethyl)phosphorodithioate. — Calculated: P, 7.55%; Br, 19.30%; S, 15.63%. Found: P, 7.45%; Br, 19.12%; S, 15.55%.

Example 5

Production of

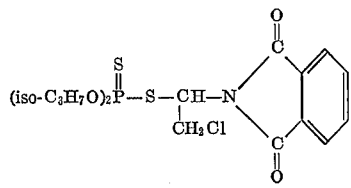

In 250 g. of toluene were dissolved 21.4 g. of o,o-diisopropyldithiophosphoric acid and 26.8 g. of N-(1-isopropoxy-2-chloroethyl)phthalimide with stirring, and after further adding 15 g. of 98% by weight concentrated sulfuric acid to the solution, the mixture was heated for 3 hours at 50° C. to finish the reaction. After cooling, the toluene layer of the product was washed with water, a 2% sodium hydroxide solution, again with water and then toluene was distilled away to provide 35.6 g. of a faint orange oily liquid. The product was then purified by means of column chromatography.

Elementary analysis as o,o-di-isopropyl-S-(1-phthalimido-2-chloroethyl)phosphorodithioate.—Calculated: P, 7.34%; Cl, 8.40%; S, 15.20%. Found: P, 7.41%; Cl, 8.35%; S, 15.31%.

Example 6

Production of

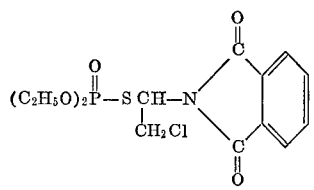

In 200 g. of toluene were dissolved 17.9 g. of o,o-diethylthiophosphoric acid and 25.3 g. of N-(1-ethoxy-2-chloroethyl)phthalimide with stirring, and after adding thereto 13.6 g. of anhydrous zinc chloride and 10 ml. of 98% by weight concentrated sulfuric acid, the resultant mixture was heated for 3 hours at 40° C. to finish the reaction. After cooling, the reaction product was placed in a separating funnel and washed with hydrochloric acid to remove zinc chloride. After washing with a sodium carbonate solution and then with water, toluene was distilled away to provide 37.5 g. of a faint yellow oily liquid of o,o-diethyl - S - (1-phthalimido-2-chloroethyl)phosphorothioate. The product was purified by means of column chromatography using alumina.

Elementary analysis.—Calculated: P, 8.20%; Cl, 9.39%; S, 8.49%. Found: P, 8.15%; Cl, 9.41%; S, 8.36%.

Example 7

Production of

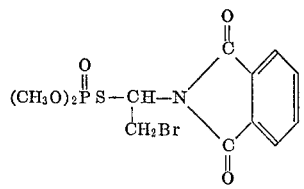

In 200 g. of benzene were dissolved 14.9 g. of o,o-dimethylthiophosphoric acid and 29.8 g. of N-(1-ethoxy-2-bromoethyl)phthalimide with stirring and after further adding 8 g. of anhydrous zinc chloride and 10 ml. of 98% by weight concentrated sulfuric acid, the mixture was heated for 3 hours at 40° C. to complete the reaction. After cooling, the reaction product was placed in a separating funnel, washed with a hydrochloric acid solution, a sodium carbonate solution, and then with water, and benzene was distilled away to provide 35 g. of a yellow-brown oily material. The product was purified by means of column chromatography using alumina.

Elementary analysis as o,o-dimethyl-S-(1-phthalimido-2-bromoethyl)phosphorothioate.—Calculated: P, 7.86%; Br, 20.27%; S, 8.13%. Found: P, 7.83%; Br, 19.87%; S, 7.98%.

Example 8

Production of

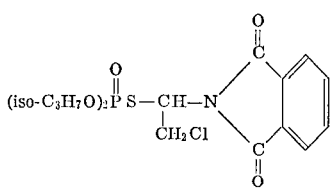

To 250 g. of benzene were added 19.8 g. of o,o-di-isopropylthiophosphoric acid, 25.3 g. of N-(1-ethoxy-2-chloroethyl)phthalimide, and 13.6 g. of anhydrous zinc chloride with stirring and the mixture was heated for 3 hours at 50° C. to finish the reaction. After cooling, the reaction product was placed in a separating funnel, washed with a hydrochloric acid solution, a sodium carbonate solution, and then water, and benzene was distilled away to provide 37 g. of a yellow-brown oily material. The product was purified by means of column chromatography using alumina.

Elementary analysis as o,o-di-isopropyl-S-(1-phthalimido-2-chloroethyl)phosphorothioate.—Calculated: P, 7.63%; Cl, 8.74%; S, 7.90%. Found: P, 7.58%; Cl, 8.71%; S, 7.83%.

What is claimed is:

1. A process for producing an organic phosphoric acid ester represented by the general formula

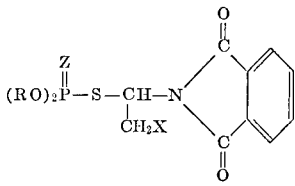

wherein

R represents an alkyl group having 1–3 carbon atoms, Z represents an oxygen atom or a sulfur atom, and X represents a chlorine atom or a bromine atom which comprises reacting an o,o-dialkylthiophosphoric acid or an o,o-dialkyldithiophosphoric acid represented by the general formula

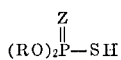

wherein R and Z have the above meaning with N-(1-alkoxy-2-haloethyl) phthalimide represented by the general formula

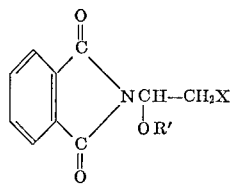

wherein

R' represents an alkyl group having 1–3 carbon atoms and X has the above meaning in the presence of an acid catalyst selected from a protonic acid, Lewis acid or a mixture thereof; wherein said protonic acid is selected from the group consisting of hydrochloric acid, sulfuric acid and phosphoric acid; and said Lewis acid is zinc chloride.

2. The process as claimed in claim 1 wherein said N-(1-alkoxy-2-haloethyl)phthalimide is selected from N-(1-methoxy-2-chloroethyl)phthalimide, N-(1-methoxy-2-bromoethyl)phthalimide, N-(1-ethoxy-2-chloroethyl)phthalimide, N-(1-ethoxy-2-bromoethyl)phthalimide, N-(1-n-propoxy-2-bromoethyl)phthalimide, N-(1-n-propoxy-2-chloroethyl)phthalimide, N-(1-isopropoxy-2-chloroethyl)phthalimide, and N-(1-isopropoxy-2-bromoethyl)phthalimide.

3. The process as claimed in claim 1 wherein said acid catalyst is a combination of zinc chloride and one of the members selected from the group consisting of hydrochloric acid, sulfuric acid and phosphoric acid.

4. The process as claimed in claim 1 wherein said reaction is conducted in a solvent.

5. The process as claimed in claim 6 wherein said solvent is selected from the group consisting of benzene, toluene, xylene, chlorobenzene and carbon tetrachloride.

6. The process as claimed in claim 1 wherein said reaction is conducted at a temperature of from room temperature to 110° C.

7. The process as claimed in claim 1 wherein said acid catalyst is said protonic acid.

8. The process as claimed in claim 1 wherein said acid catalyst is zinc chloride.

9. The process as claimed in claim 8 wherein the proportion of the acid catalyst is 0.1–1.5 mols per mol of the o,o-dialkylthiophosphoric acid or the o,o-dialkyldithiophosphoric acid.

10. The process as claimed in claim 8 wherein said acid catalyst is the protonic acid which is used in an amount of 0.5–1.5 mols per mol of the o,o-dialkylthiophosphoric acid or the o,o-dialkyldithiophosphoric acid.

11. The process as claimed in claim 5 wherein the ratio of protonic acid and zinc chloride is 1:0.1–1.

12. The process as claimed in claim 9 wherein the reaction time is from about 1 hour to about 5 hours.

13. The process as claimed in claim 1 wherein the o,o-dialkylthiophosphoric acid or o,o-dialkyldithiophosphoric acid is present in an amount of from 1–1.5 mols per mol of N-(1-alkoxy-2-haloethyl) phthalimide.

References Cited

UNITED STATES PATENTS 3,658,840   4/1972   Oswald _____ 260—326 E

JOSEPH A. NARCAVAGE, Primary Examiner

U.S. Cl. X.R.

260—999